United States Patent [19]

Coleman

[11] 4,239,238

[45] Dec. 16, 1980

[54] RECORD EXTRACTING MECHANISM FOR CADDY TYPE VIDEO DISC PLAYER

[75] Inventor: Clyde F. Coleman, Crawfordsville, Ind.

[73] Assignee: RCA Corporation, New York, N.Y.

[21] Appl. No.: 81,494

[22] Filed: Oct. 1, 1979

[30] Foreign Application Priority Data

Apr. 6, 1979 [GB] United Kingdom ............... 12288/79
Apr. 6, 1979 [GB] United Kingdom ............... 12290/79

[51] Int. Cl.³ .......................... G11B 5/82; G11B 25/04
[52] U.S. Cl. ................... 274/9 B; 206/312; 206/444; 360/86; 360/99; 360/133
[58] Field of Search ............... 274/9 B, 23 A; 360/86, 360/97, 98, 99, 133; 358/128.5, 128.6; 206/444, 309, 312

[56] References Cited

U.S. PATENT DOCUMENTS

| | | | |
|---|---|---|---|
| 4,098,511 | 7/1978 | Leedom | 274/9 B |
| 4,124,866 | 11/1978 | Coleman | 360/133 |
| 4,133,540 | 1/1979 | Torrington | 274/9 B |
| 4,164,782 | 8/1979 | Stewart | 360/133 |

Primary Examiner—Steven L. Stephan
Attorney, Agent, or Firm—Eugene M. Whitacre; Joseph S. Tripoli; Dilip A. Kulkarni

[57] ABSTRACT

A record caddy, suitable for use with a video disc player, includes a sleeve and a record retaining spine removably located therein. Disposed on the spine are latch members for releasably locking the spine to the sleeve. Latch defeat fingers, disposed in the player, are wedged between the respective spine latch fingers and interior portions of the sleeve during a caddy arrival at a fully inserted position in the player, so that the spine latch fingers are deflected in a manner freeing the spine from the sleeve. The latch defeat fingers carry extensions which are subject to reception in pockets disposed on the spine latch fingers to lock the spine to the player when the caddy is fully inserted into the player, whereby the spine, freed from the sleeve and secured to the player, is removed from the sleeve and retained in the player resting on a platform along with an associated record during subsequent sleeve withdrawal.

7 Claims, 19 Drawing Figures

RECORD EXTRACTING MECHANISM FOR CADDY TYPE VIDEO DISC PLAYER

This invention generally relates to a caddy-type video disc player, and more particularly, it relates to a player mechanism suitable for loading a record into the player and retrieving it therefrom without the necessity for the user to touch the record.

In certain video disc systems, information is stored on a disc record in the form of geometric variations in the bottom of a continuous spiral groove disposed on the record surface. The variations in capacitance between an electrode incorporated in a groove-riding stylus and a conductive property of the record are sensed to reproduce the stored information. A capacitance-type video disc system is illustratively disclosed in U.S. Pat. No. 3,842,194 (Clemens).

In such systems, it is advantageous to mount a groove-riding pickup stylus in a demountable cartridge. The cartridge is, in turn, mounted in a translatable carriage, which is radially driven during playback in correlation with the motion of the groove-riding stylus. U.S. Pat. No. 3,870,320 (Torrington), discloses a type of carriage translating system.

It is beneficial to enclose a record in a thin plastic caddy which comprises a jacket and a record retaining spine removably located therein. The spine additionally serves as a closure device for the jacket when it is fully seated therein. For record loading, a full caddy is inserted into an input slot provided in the player. A record extracting mechanism disposed in the player removes the record from the caddy during subsequent jacket withdrawal, whereby the record is retained in the player. The player is equipped with a platform for supporting the retained record. The retained record is subsequently transferred to the turntable for playback. For subsequent record retrieval, the record is raised relative to the turntable, and an empty jacket is inserted into the player, thereby returning the record back into the caddy. Withdrawal of the caddy effects record removal from the player. Reference may be made to the U.S. Pat. Nos. issued to Leedom (4,098,511), Coleman (4,124,866) and Torrington (4,133,540) for examples of prior art record extracting mechanisms suitable for use in a video disc type player.

In the above-mentioned type systems, it is desirable to prevent an enclosed record form accidentally falling out of its protective caddy, and to deter indiscriminate access to the enclosed record. To this end, the record retaining spine is provided with a pair of integrally-molded flexural locking fingers carrying protruding elements which are seated in pockets disposed in the jacket when the spine is fully received therein, whereby the spine is locked in place. When a full caddy is inserted into the player for loading the enclosed record therein, the flexural locking members are deflected to allow separation of the spine from the jacket. Reference may be made to the U.S. Pat. No. 4,164,782, filed in the name of Stewart, for an illustration of a caddy locking mechanism.

An improved record extracting mechanism suitable for use with above-mentioned type systems, and in accordance with this invention, will be described herein. A movably-mounted latch defeat portion is disposed in the player along the caddy insertion path when occupying the starting position thereof such that it engages the spine latch member during a caddy arrival at a fully inserted position in the player so that the spine latch member is deflected in a manner freeing the spine from the jacket. A spine gripper portion, subject to engagement with the spine during an occupied caddy arrival at the fully inserted position, is also movably mounted in the player for securing the spine to the player, whereby the spine, freed from the jacket and secured to the player, is removed from the jacket and retained in the player resting on a platform along with an associated record during subsequent jacket withdrawal. The latch defeat portion is displaced away from the starting position to a deflected position during the jacket withdrawal, thereby freeing the spine latch member from interference by the latch defeat portion. An empty jacket is inserted into the player for retrieving the retained record resting on the platform. The spine latch member, having been freed from interference by the latch defeat portion, serves to secure the spine to the jacket upon arrival of the jacket at the fully inserted position. The location of the latch defeat portion occupying the deflected position is such that the empty jacket engages the deflected latch defeat portion to cause further displacement thereof during arrival of the empty jacket at the fully inserted position for effecting motion of the spine gripper portion away from the spine in a manner releasing the spine from the player, whereby the spine secured to the jacket effects removal of an associated record from the player during subsequent caddy withdrawal.

Figure 1:
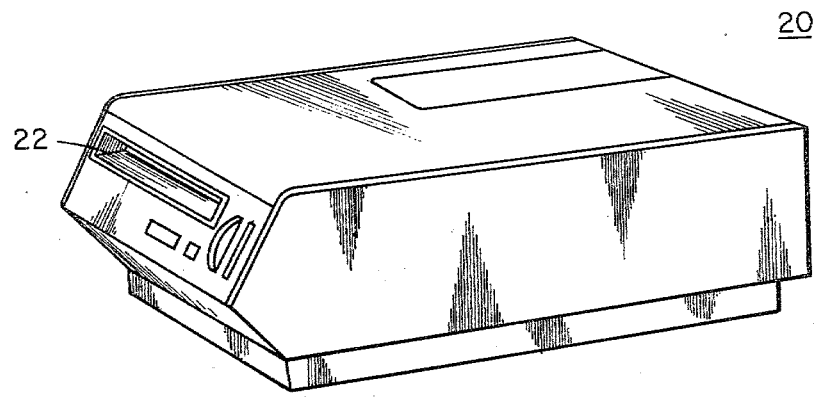
FIG. 1 shows a video disc player suitable for use with a record caddy and incorporating a record removing mechanism in accordance with this invention.
Figure 7:
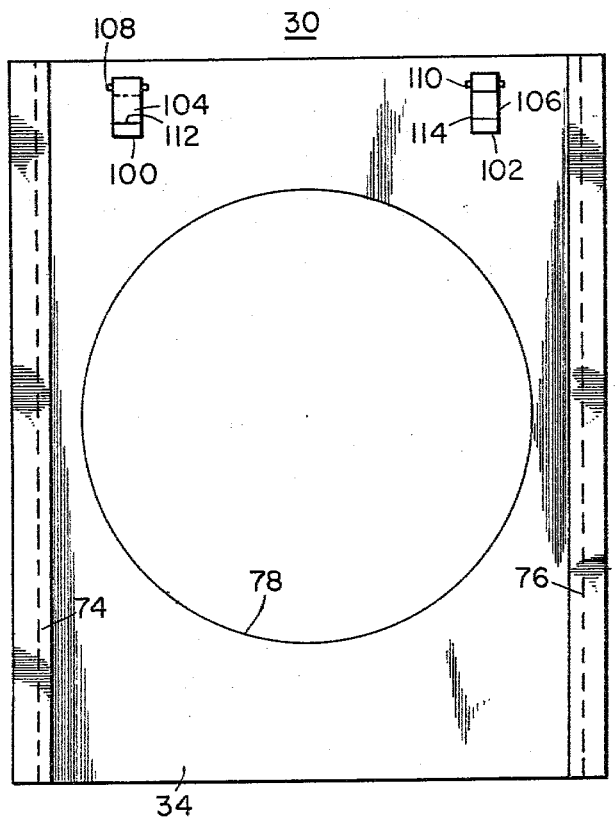
Figure 12:
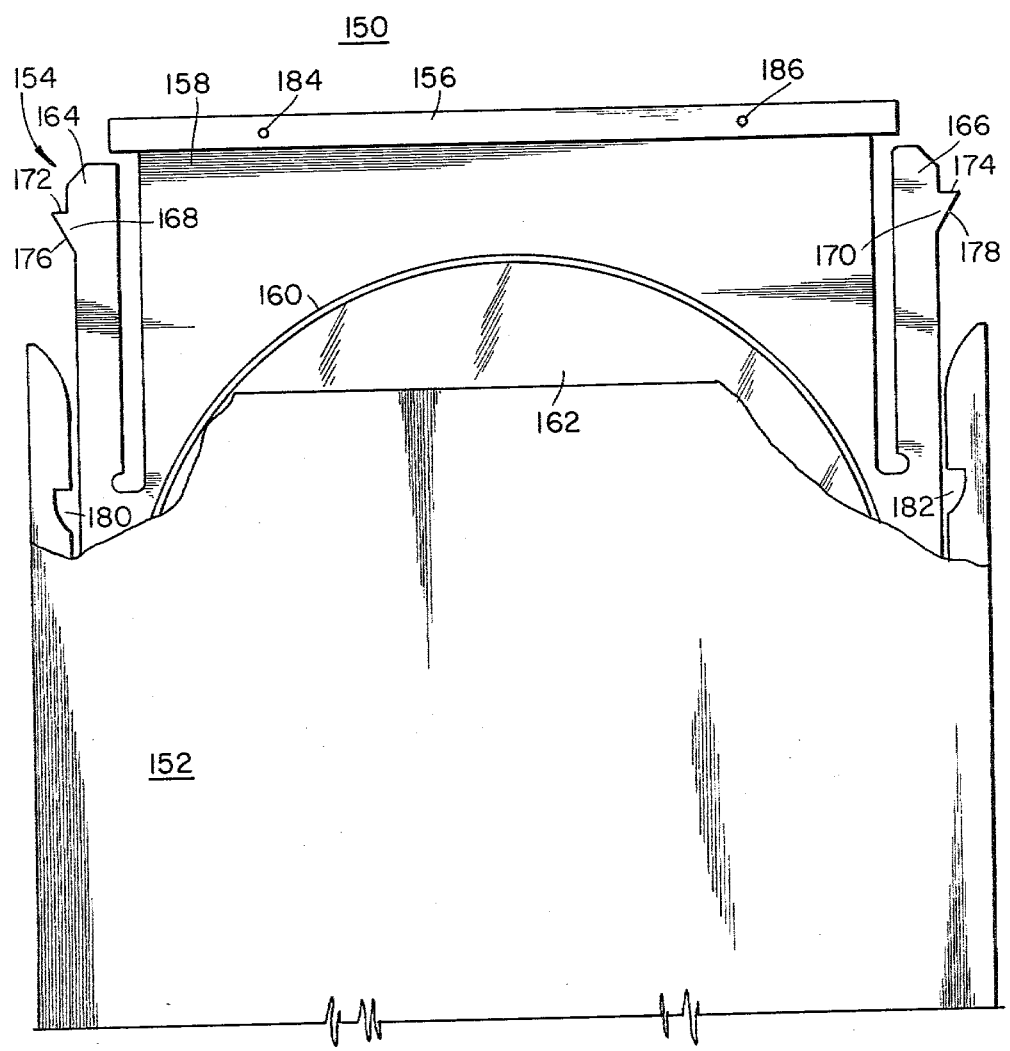
Figure 13:
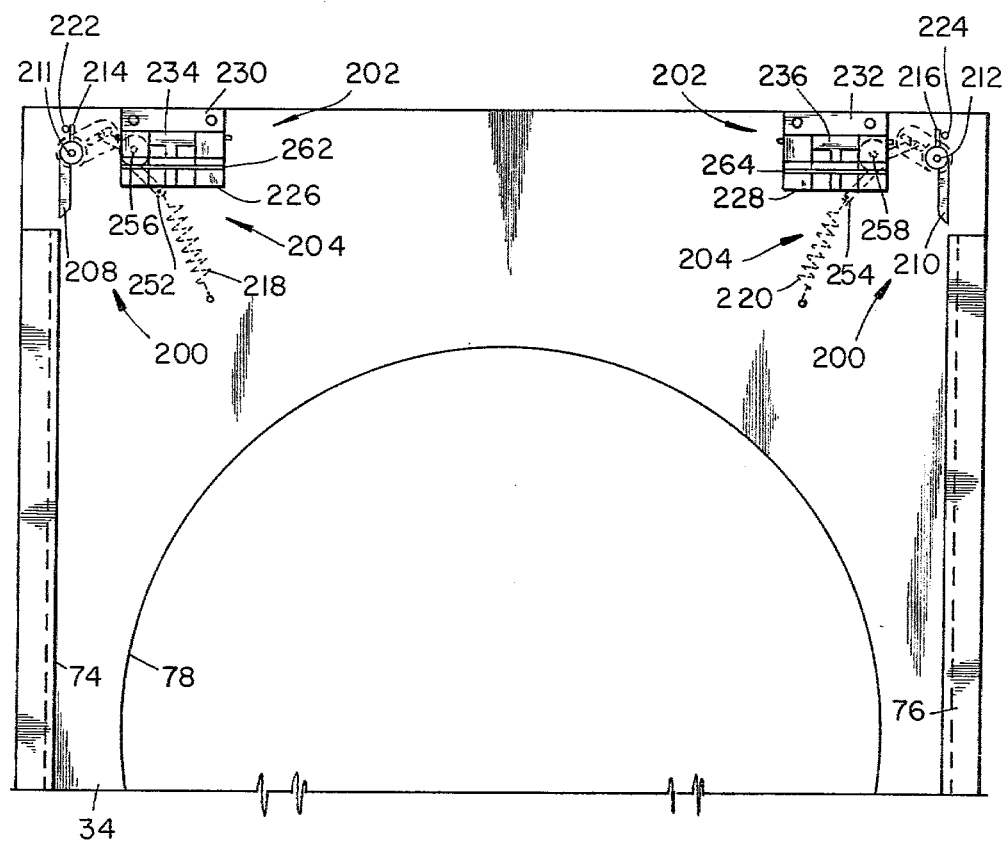
Figure 14:
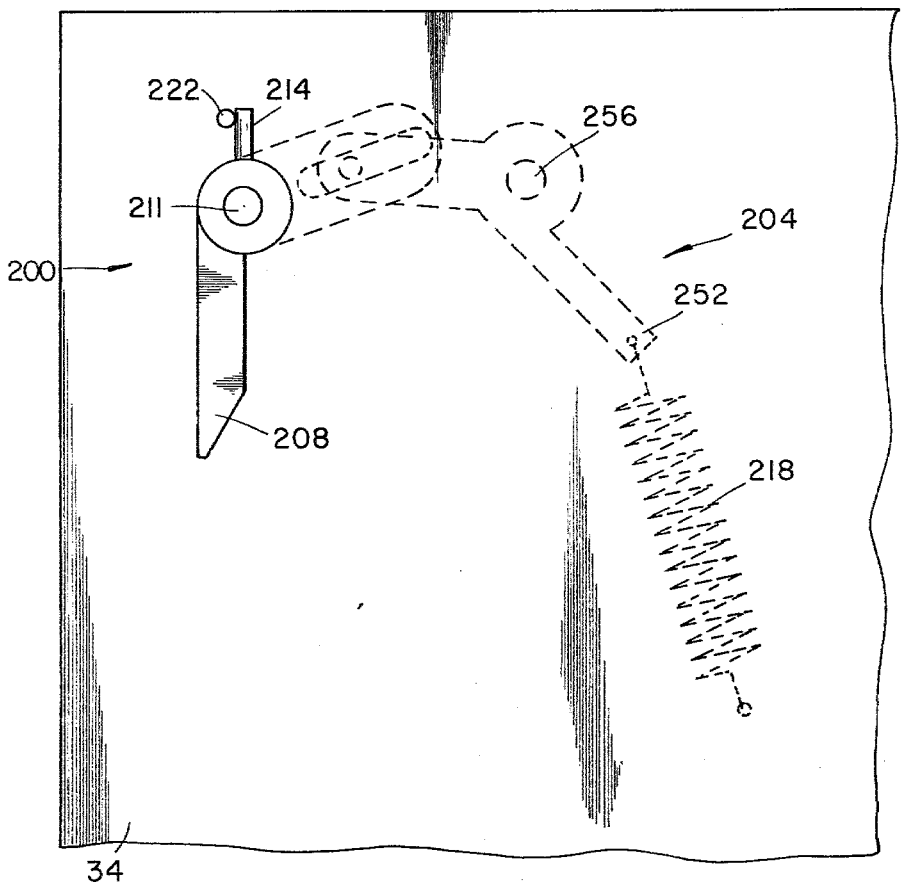
Figure 15:
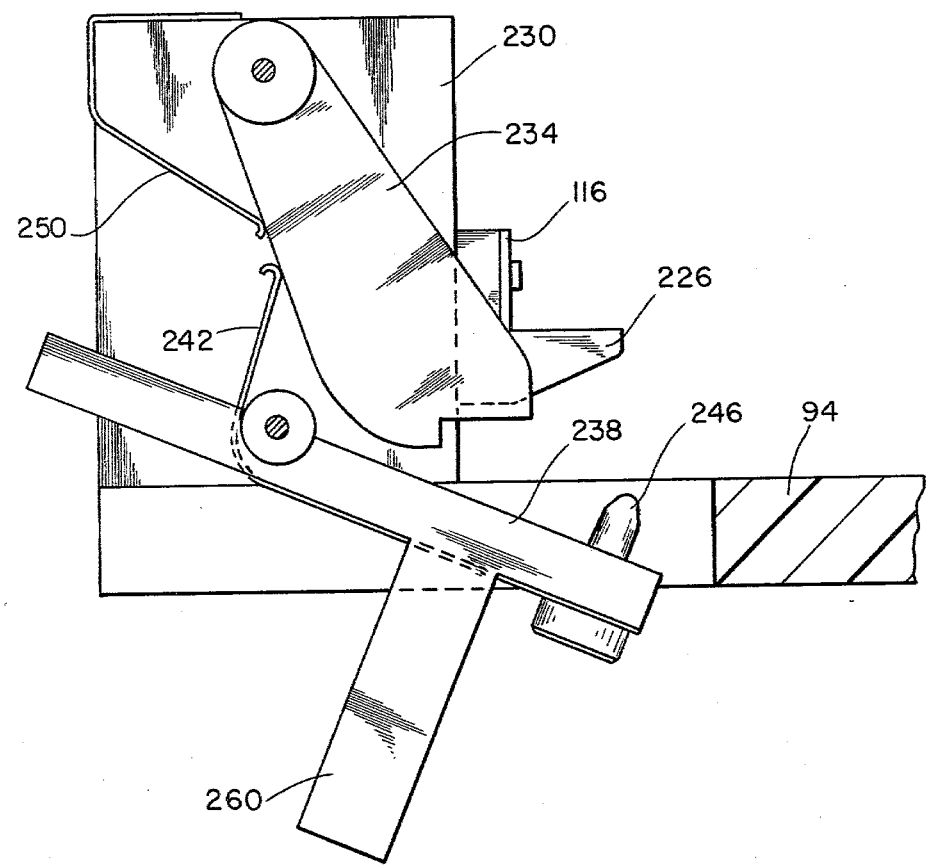

FIG. 7 diagrammatically shows the record removing mechanism of FIG. 1;

FIGS. 8–11 schematically illustrate the operation of the record removing mechanism of FIG. 7;

FIG. 12 shows a modified record caddy;

FIG. 13 represents another embodiment of the record removing mechanism pursuant to this invention, and suitable for use with the modified record caddy of FIG. 12;

FIGS. 14 and 15 respectively depict different portions of the FIG. 13 embodiment of the record removing mechanism; and FIGS. 16–19 diagrammatically illustrate the operation of the record removing mechanism of FIGS. 13–15.

As shown in FIG. 1, a video disc player 20 has an input slot 22 disposed at the front end thereof. To load a record into the player, a record caddy 24, comprising a sleeve 26 and a record retaining spine 28 as shown in FIGS. 3–6, is inserted into the player through the input slot 22. A record removing mechanism 30 (FIGS. 2 and 7–11) removes the spine 28 and the associated record 32 from the sleeve 26 and retains them in the player resting on a platform 34 disposed therein when the sleeve is withdrawn from the player, in the manner to be described hereinafter in accordance with this invention.

Figure 2:
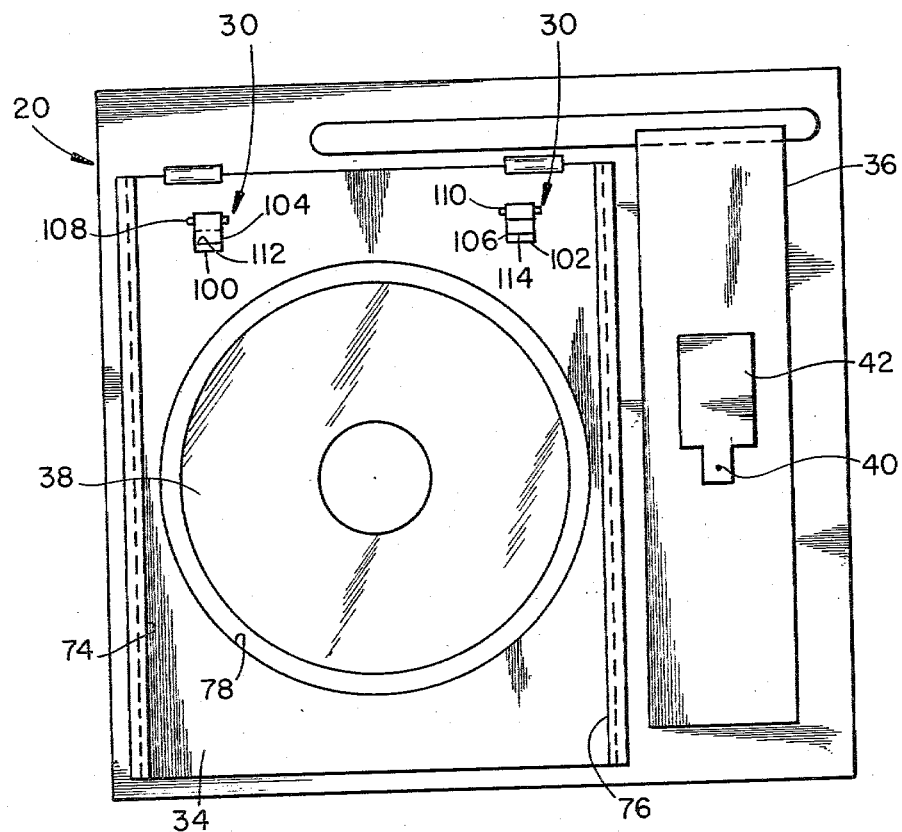
FIG. 2 is a schematic representation of the player of FIG. 1.
Figure 3:
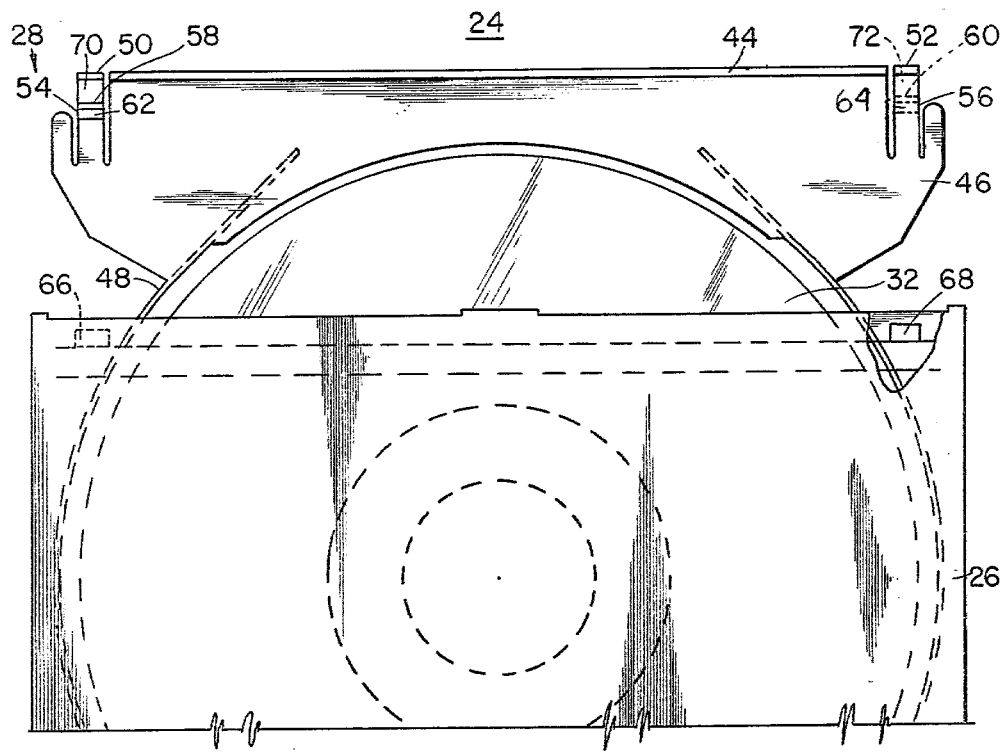
FIG. 3 is a caddy suitable for use with the player of FIG. 1.
Figure 4:
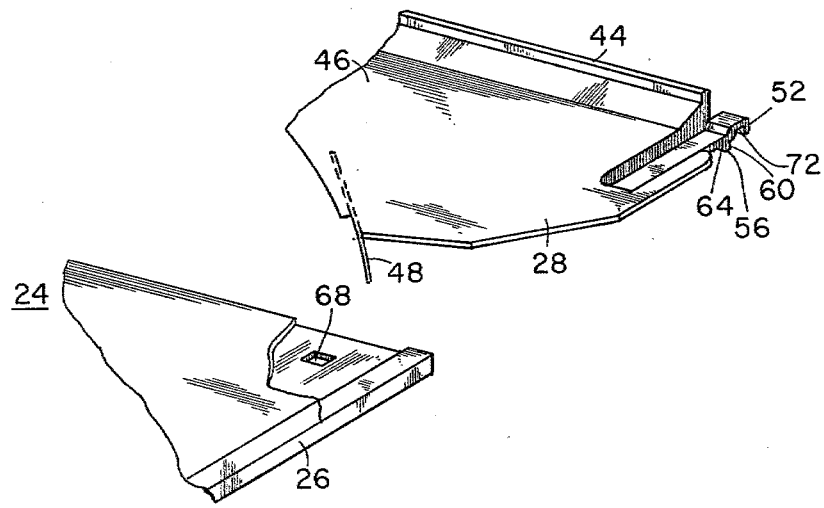
FIG. 4 is a partial perspective view of the caddy of FIG. 3.
Figure 5:
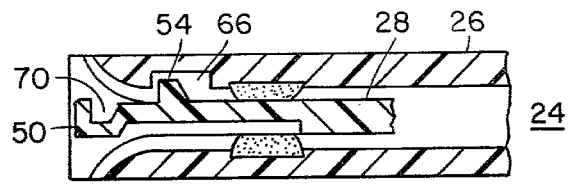
FIGS. 5 and 6 are sectional views of the caddy of FIGS. 3 and 4 showing the operation of the spine latch members.
Figure 6:
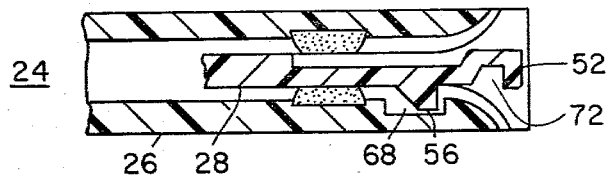

As shown in FIG. 2, the player includes a carriage 36 which is translated toward the center of a turntable 38, rotatably mounted in the player, in synchronism with the motion of a pickup stylus 40 during playback. The pickup stylus 40 is mounted in a removable cartridge 42 which is installed in a compartment provided in the carriage 36.

As shown in FIGS. 3–6, the record retaining spine 28 has a portion 44 which serves as a closure when the spine is fully inserted into the sleeve, and a portion 46 having a circular ring 48 for receiving the record 32. The spine 28 is further provided with a pair of integrally-molded, flexural latch members 50 and 52, which have free ends adapted for deflection, for example, perpendicular to the major surface of the spine. Each of the spine latch members 50 and 52 has a protruding element 54 and 56. Each of the protruding elements 54 and 56 has a square edge 58 and 60, and an inclined edge 62 and 64. The protruding elements 54 and 56 are received in pockets 66 and 68 disposed in the sleeve 26 for locking the spine 28 in place when it is fully inserted into the sleeve. The free ends of the spine latch members 50 and 52 are curved to define hook-like elements 70 and 72.

Figure 8:
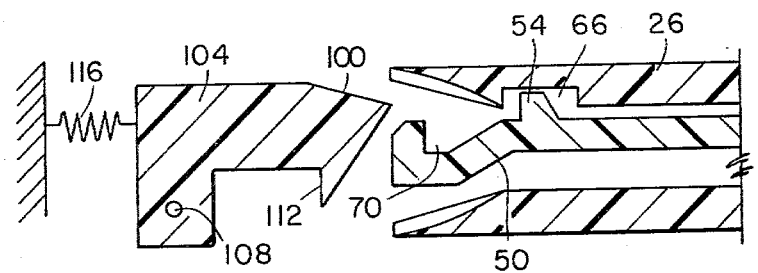

The record removing apparatus 30 of this invention will now be described in detail in conjunction with FIGS. 7–11. The record support platform 34 is equipped with a pair of rails 74 and 76 for guiding the caddy 24 during its insertion into the player through the input slot 22. As the caddy 24 arrives at a fully inserted position in the player, as shown in FIG. 8, the wedge-like latch defeat portions 100 and 102 of a pair of flippers 104 and 106, pivotally mounted on the platform 34 about pins 108 and 110 respectively, enter the sleeve 26 to deflect the spine latch members 50 and 52 in the manner shown in FIG. 9, whereby the spine 28 and the enclosed record 32 are freed from the sleeve.

Figure 9:
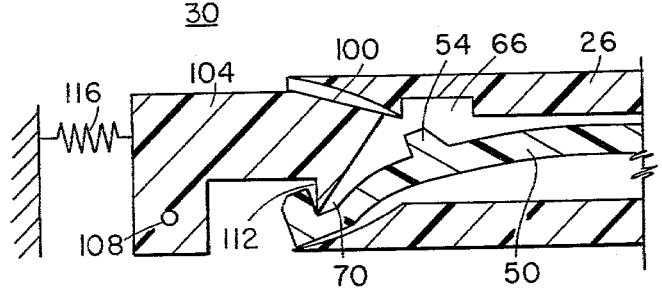
Figure 10:
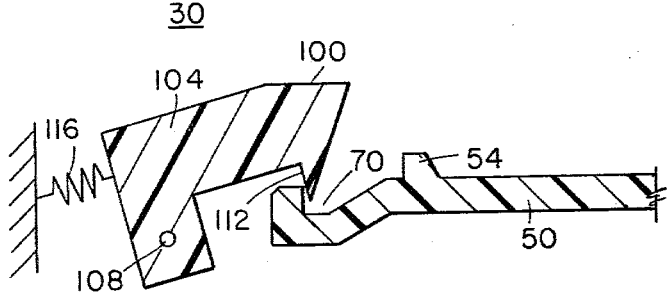
Figure 11:
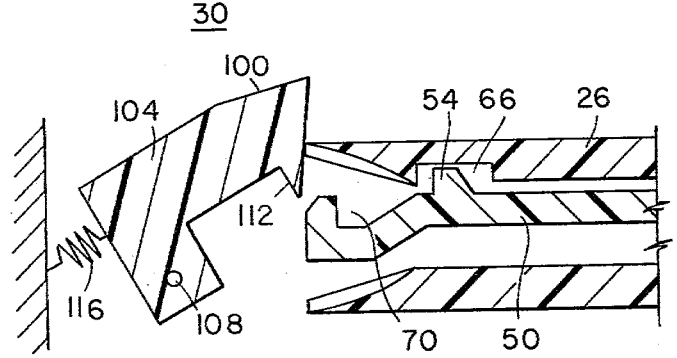

As the caddy 24 arrives at the fully inserted position in the player, the spine gripper portions 112 and 114 disposed on the flippers 104 and 106 engage the hook-like elements 70 and 72, as shown in FIG. 9, to lock the spine 28 to the player. Since the spine 28 is released from the sleeve 26 and secured to the player, subsequent withdrawal of the sleeve leaves the spine and the record 32 in the player resting on the support platform 34. The spine latch members 50 and 52 deflect the flippers 104 and 106 to deflected positions shown in FIG. 10 when the sleeve 26 is removed form the player.

The record 32 resting on the support platform 34 is transferred to the turntable 38 for playback by suitable means. For example, the platform 34 may be depressed relative to the turntable 38 in the manner described in the Stewart U.S. Pat. No. (4,164,782) to deposit the record 32 on the turntable. Alternately, the turntable 38 may be raised relative to the platform 34 to transfer the record 32 from the platform to the turntable. The platform 34 has an opening 78 having a diameter larger than the diameter of the turntable 38, but smaller than the record diameter. The record 32 is returned back to the platform 34 after playback.

To retrieve the record 32, the empty sleeve 26 is reinserted into the player. Full insertion of the sleeve 26 into the player further deflects the flippers 104 and 106 to the position shown in FIG. 11, whereby the spine 28 is freed from the player. The protruding elements 54 and 56 disposed on the spine latch members 50 and 52 snap back into pockets 66 and 68 provided in the sleeve 26 (FIG. 11) to latch the spine 28 to the sleeve. Since the spine 28 is locked to the sleeve 26 and released from the player, subsequent withdrawal of the sleeve removes the record 32 and the spine from the player.

The operation of the other flipper 106 is similar to the operation of the flipper 104 shown in FIGS. 8–11. A pair of light springs (e.g., 116) are provided to restore the flippers 104 and 106 to their respective starting positions such that they are disposed in the cover insertion path as indicated in FIG. 8 upon withdrawal of the caddy from the player.

The second embodiment of this invention will now be described in conjunction with FIGS. 12–19. The modified record caddy 150 of FIG. 12 comprises a sleeve 152 and a record retaining spine 154. The spine 154 has a portion 156 which serves as a closure when the spine is fully inserted into the sleeve, and a portion 158 having an opening 160 for receiving a record 162. The spine 154 is further provided with a pair of integrally-molded, flexural latch members 164 and 166, which have free ends adapted for deflection, for example, parallel to the major surface of the spine. Each of the spine latch members 164 and 166 has a protruding element 168 and 170. Each of the protruding elements 168 and 170 has a square edge 172 and 174, and an inclined edge 176 and and 178. The protruding elements 168 and 170 are received in pockets 180 and 182 disposed in the sleeve 152 for locking the spine 154 in place when it is fully inserted into the sleeve. The holes 184 and 186 are provided in the closure portion 156 for the purposes to be described hereinafter.

Figure 16:
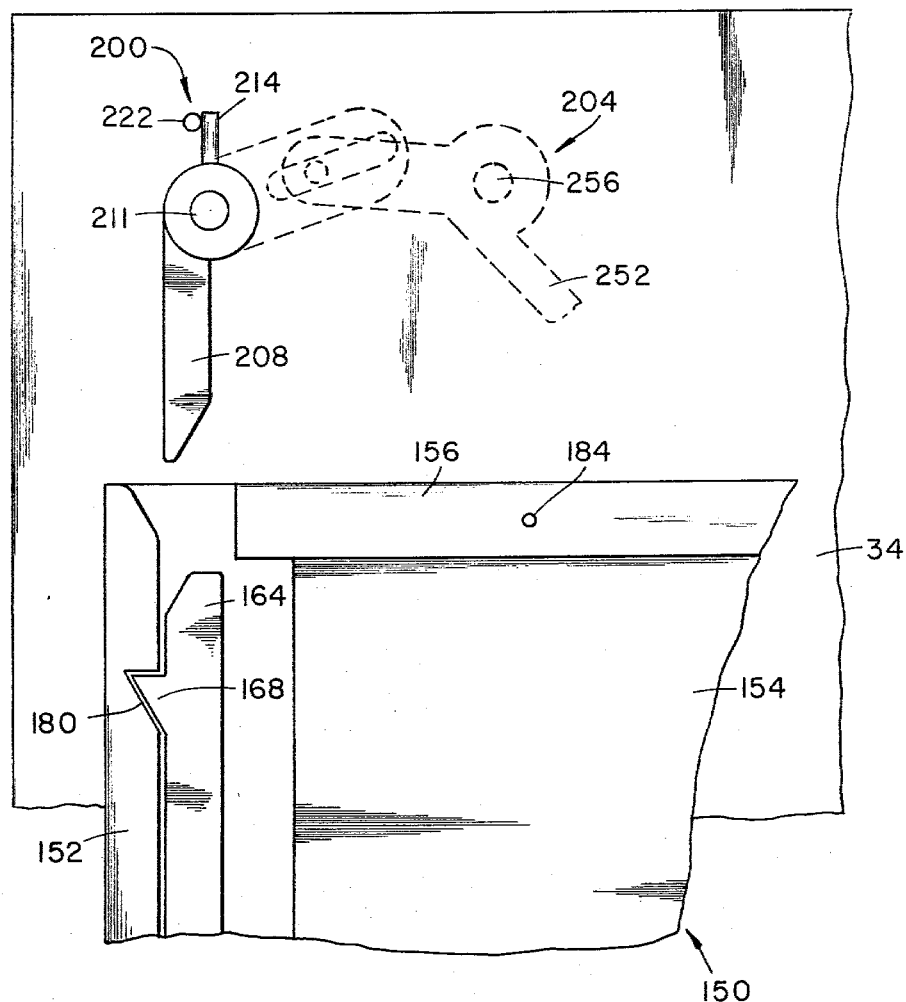

The second embodiment of the record removing mechanism comprises a latch defeat mechanism 200, a spine gripper mechanism 202 and a linkage 204 coupling the latch defeat mechanism to the spine gripper mechanism as seen from FIG. 13. The latch defeat mechanism 200 comprises a pair of unlocking fingers 208 and 210 pivotally mounted on the platform 34 by means of pins 211 and 212 as shown in FIGS. 13 and 14. Each one of the spine unlocking fingers 208 and 210 is provided with a tab, 214 and 216. A pair of springs 218 and 220 bias the tabs 214 and 216 against the respective stops 222 and 224 to dispose the spine unlocking fingers 208 and 210 at their respective starting positions as shown in FIG. 16.

Figure 17:
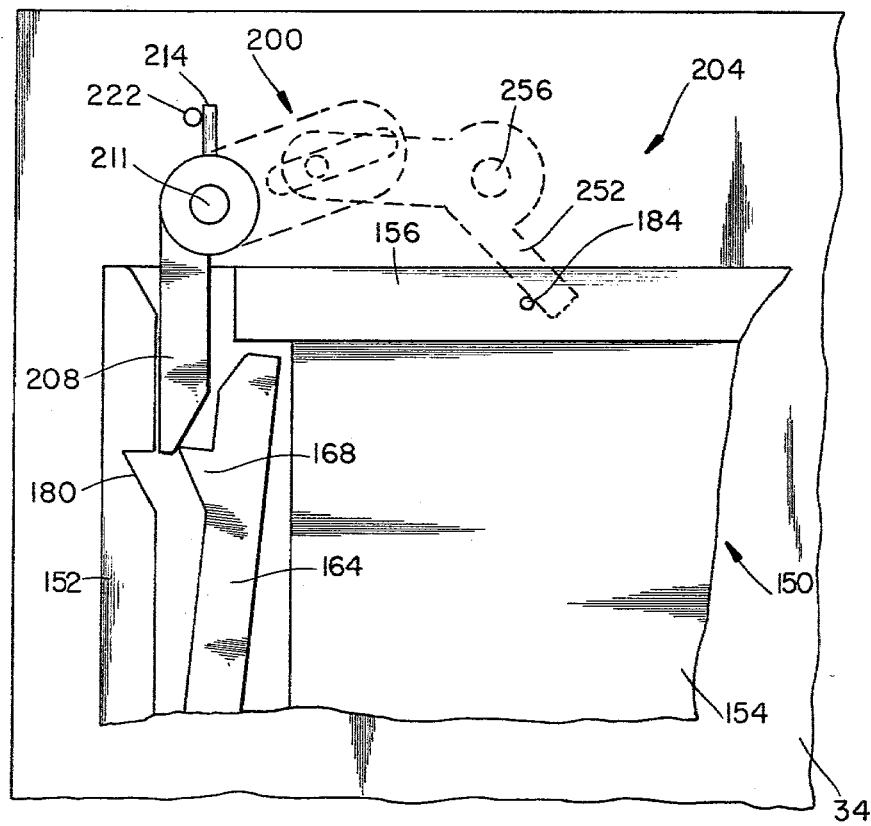
Figure 18:
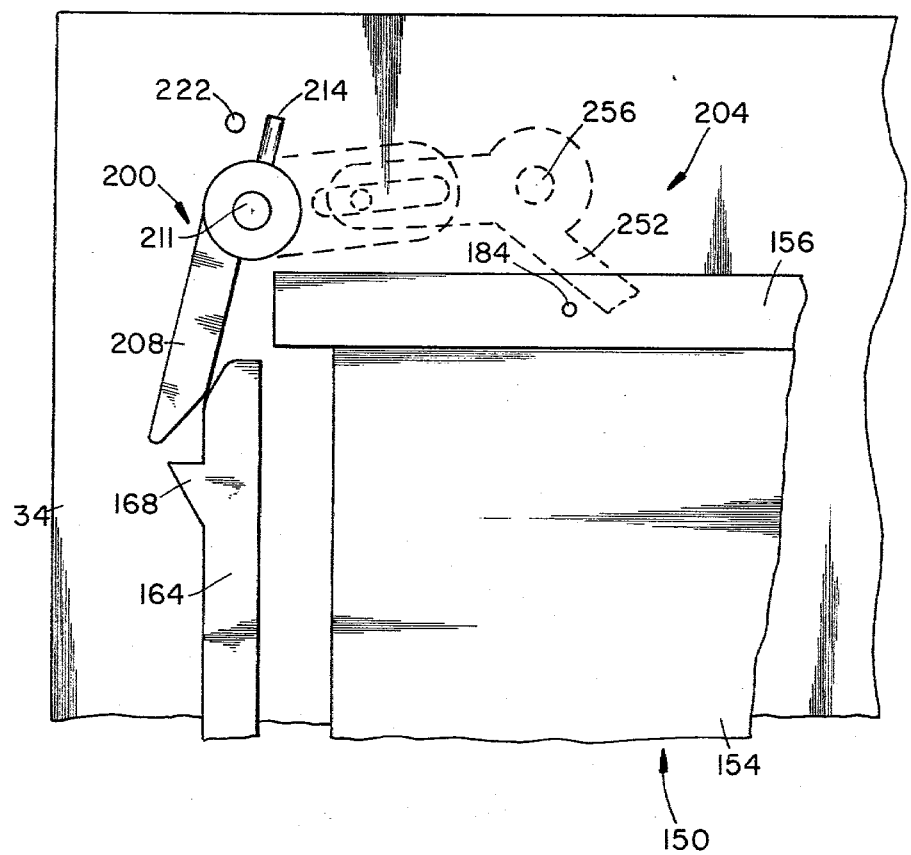
Figure 19:
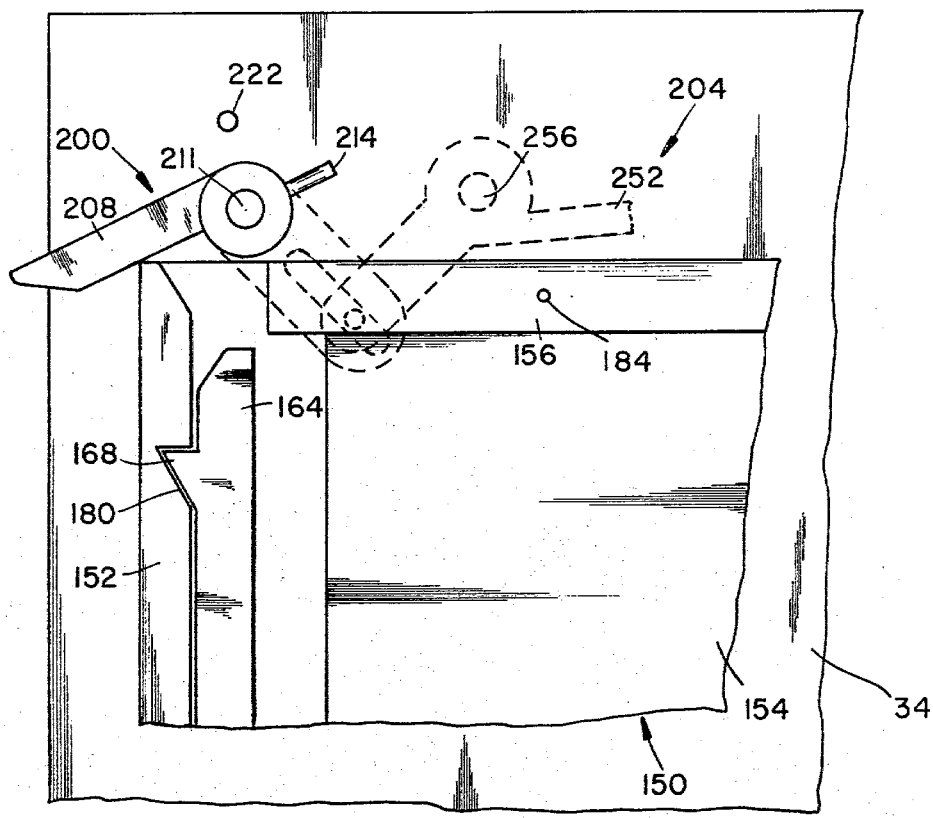

The locations of the spine unlocking fingers 208 and 210 occupying their respective starting positions are such that the unlocking fingers enter the sleeve 152 to deflect the spine latch members 164 and 166 in the manner freeing the spine 154 from the sleeve 152 as shown in FIG. 17, when the caddy 150 is fully inserted into the player through the input slot 22 along the platform rails 74 and 76.

The spine gripper mechanism 202 will now be described in reference to FIGS. 13 and 15. As the caddy 150 arrives at the fully inserted position in the player, the front edge of the caddy is guided by a pair of guide members 226 and 228 secured to a pair of mounting blocks 230 and 232 disposed on the platform 34. During the caddy arrival at the fully inserted position in the player, a pair of pivotally mounted gripper actuating members 234 and 236 are deflected by the caddy. The gripper actuating members 234 and 236, in turn, cause motion of a pair of pivotally mounted gripper actuated members (e.g., 238) by means of leaf springs (e.g., 242). A pair of gripper locking pins (e.g., 246), disposed on the gripper actuated members (e.g., 238), enter the holes 184 and 186 provided in the spine closure portion 156, whereby the spine is latched to the player. Since the spine 154 is released from the sleeve 152 and latched to the player, subsequent withdrawal of the sleeve leaves the spine and the record 162 in the player resting on the platform 34. The spine latch members 164 and 166 deflect the spine unlocking fingers 208 and 210 to the position shown in FIG. 18 when the sleeve 152 is withdrawn from the player.

To retrieve the record 162, an empty sleeve 152 is reinserted into the player. Full insertion of the sleeve 152 into the player causes further deflection of the spine unlocking fingers 208 and 210 to the position shown in FIG. 19. A pair of leaf springs (e.g., 250) disposed on the mounting blocks 230 and 232 urge the spine 154 back into the sleeve 152. The protruding elements 168 and 170 disposed on the spine latch members 164 and 166 snap back into the pockets 180 and 182 provided in the sleeve 152 to lock the spine 154 to the sleeve in the manner also illustrated in FIG. 19.

The linkage 204 between the latch defeat mechanism 200 and the spine gripper mechanism 202 comprises, as shown in FIGS. 13 and 14, a pair of levers 252 and 254 pivotally mounted to the underside of the platform 34 about pins 256 and 258. Each of said levers 252 and 254 has its one end secured to the respective one of said springs 218 and 220 and has its other end slidably connected to a slotted arm secured to the respective one of the spine unlocking fingers 208 and 210. The further displacement of the spine unlocking fingers 208 and 210 from the position shown in FIG. 18 to the position shown in FIG. 19 causes the levers 252 and 254 to engage the respective gripper actuated members (e.g., an extension 260 of the actuated member 238 in the manner retracting the gripper locking pins (e.g., 246) away from the spine 154 so that the spine is released from the player. The spine 154, being freed from the player and latched to the sleeve 152, effects record retrieval when the sleeve is withdrawn from the player.

When the caddy 150 is withdrawn from the player, the springs 218 and 220 return the spine unlocking fingers 208 and 210 to their respective starting positions. The leaf springs (e.g., 250) bias the gripper actuating members 234 and 236 against the respective stops 262 and 264 in preparation for the next cycle of operations.

What is claimed is:

1. A player for recovering prerecorded signals from a disc record removably subject to occupancy of a protective cover comprising a jacket and a record retaining spine removably located therein; said spine being provided with a latch member for releasably securing said spine to said jacket; said player comprising:
   (A) a housing having an input slot into which an occupied cover is inserted along a path for loading a record therein;
   (B) a guide disposed in said housing for supporting a record;
   (C) a latch defeat portion movably-mounted in said housing and subject to deflection away from a starting position; said latch defeat portion being located along said cover insertion path when occupying said starting position thereof such that it engages said spine latch member during an occupied cover arrival at a fully inserted position in said player so that said spine latch member is deflected in a manner freeing said spine from said jacket; and
   (D) a spine gripper portion movably-mounted in said housing subject to engagement with said spine during an occupied cover arrival at said fully inserted position for securing said spine to said housing, whereby said spine, which is freed from said jacket and secured to said housing, is removed from said jacket and retained in said player resting on said guide along with an associated record during subsequent jacket withdrawal;

wherein said latch defeat portion is displaced away from said starting position to a deflected position during said jacket withdrawal, thereby freeing said spine latch member from interference by said latch defeat portion.

2. The player as defined in claim 1 wherein an empty jacket is inserted into said input slot along said path for retrieving said retained record resting on said guide; wherein said spine latch member, having been freed from interference by said latch defeat portion, serves to secure said spine to said jacket upon arrival of said jacket at said fully inserted position; wherein the location of said latch defeat portion occupying said deflected position is such that said empty jacket engages said deflected latch defeat portion to cause further displacement thereof during arrival of said empty jacket at said fully inserted position for effecting motion of said spine gripper portion away from said spine in a manner releasing said spine from said housing, whereby said spine secured to said jacket effects removal of an associated record from said player during subsequent cover withdrawal.

3. A player for recovering prerecorded signals from a disc record removably subject to occupancy of a protective cover comprising a jacket and a record retaining spine removably located therein; said spine being provided with a latch member for releasably securing said spine to said jacket; said player comprising:
   (A) a housing having an input slot into which an occupied cover is inserted along a path for loading a record therein;
   (B) a turntable rotatably mounted in said housing;
   (C) a guide disposed in said housing;
   (D) a spine unlocking member movably-mounted in said housing and subject to deflection away from a starting position; said spine unlocking member being located along said cover insertion path when occupying said starting position thereof such that it is wedged between said spine latch member and an interior portion of said jacket during an occupied cover arrival at a fully inserted position in said player so that said spine latch member is deflected in a manner freeing said spine from said jacket;
   (E) a spine gripper member movably-mounted in said housing and subject to engagement with said spine during an occupied cover arrival at said fully inserted position for securing said spine to said housing, whereby said spine, which is freed from said jacket and secured to said housing, is removed from said jacket and retained in said player resting on said guide along with an associated record during a jacket withdrawal subsequent to an occupied cover arrival at said fully inserted position;

wherein said spine unlocking member is displaced away from said starting position to a deflected position when released from engagement with said interior portion of said jacket during said jacket withdrawal, whereby said spine latch member is freed from interference by said spine unlocking member;
   (F) means for transferring said retained record from said guide to said turntable for playback; said transferring means also serving to transfer said retained record from said turntable to said guide for record retrieval;

wherein an empty jacket is inserted into said input slot along said path for retrieving said retained record resting on said guide; wherein said spine latch member, having been freed from interference by said spine unlocking member, serves to secure said spine to said jacket upon arrival of said jacket at said fully inserted position; wherein the location of said spine unlocking member occupying said deflected position is such that said empty jacket engages said deflected spine unlocking member to cause further displacement thereof during arrival of said empty jacket at said fully inserted position; and (G) means responsive to said further displacement of said spine unlocking member for effecting motion of said spine gripper member away from said spine in a manner releasing said spine from said housing so that said spine secured to said jacket effects removal of an accompanying record from said player during subsequent cover withdrawal.

4. The player as defined in claim 3 further including an additional movably-mounted spine unlocking member; wherein each of said spine unlocking members is pivotally mounted in said housing about an axis disposed substantially parallel to the axis of said turntable for lateral motion away from the other of said spine unlocking members.

5. The player as defined in claim 4 further including an additional movably-mounted spine gripper member; wherein each of said spine gripper members is pivotally mounted in said housing about an axis disposed substantially perpendicular to said axis of said movably-mounted spine unlocking members; said player additionally including means for biasing said pivotally-mounted spine gripper members in a direction urging engagement thereof with said spine upon cover arrival at said fully inserted position.

6. The player as defined in claim 5 wherein said motion effecting means comprises a pair of levers; wherein each of said levers is pivotally mounted about an axis disposed substantially parallel to the axis of the respective one of said pivotally-mounted spine unlocking members, and is responsive to motion of said respective, pivotally-mounted spine unlocking member; wherein each of said levers is subject to engagement with the respective one of said spine gripper members during said further displacement of said spine unlocking members for causing motion of said respective spine gripper member away from said spine in a manner releasing said spine from said housing.

7. The player as defined in claim 6 further including means for biasing said spine unlocking members against a pair of stops so as to dispose said spine unlocking members at said respective starting positions.

* * * * *